United States Patent [19]

James

[11] Patent Number: 5,286,135
[45] Date of Patent: Feb. 15, 1994

[54] JOINDER OF SEPARABLE TUBULAR STRUCTURES UTILIZING PRELOADED O-RING

[75] Inventor: John A. James, Pierson, Fla.

[73] Assignee: Martin Marietta Corporation, Bethesda, Md.

[21] Appl. No.: 936,420

[22] Filed: Aug. 27, 1992

Related U.S. Application Data

[63] Continuation-in-part of Ser. No. 589,464, Sep. 28, 1990, abandoned.

[51] Int. Cl.[5] ............................................. F16D 1/00
[52] U.S. Cl. ............................ 403/405.1; 403/319; 403/376
[58] Field of Search ............... 285/305, 912, 351; 403/319, 377, 326, 405.1, 376

[56] References Cited

U.S. PATENT DOCUMENTS

| | | | |
|---|---|---|---|
| 1,464,386 | 8/1923 | Ingram | 285/305 X |
| 2,890,073 | 6/1959 | Thomas | 403/326 |
| 2,935,345 | 5/1960 | Schmidt | 403/377 |
| 3,084,751 | 4/1963 | Scarborough | 285/305 X |
| 4,752,178 | 6/1988 | Greenhill | 403/326 X |
| 4,838,491 | 6/1989 | Bennett et al. | 285/351 X |

FOREIGN PATENT DOCUMENTS

| | | |
|---|---|---|
| 966298 | 7/1957 | Fed. Rep. of Germany . |
| 2233103 | 1/1974 | Fed. Rep. of Germany . |

*Primary Examiner*—Randolph A. Reese
*Assistant Examiner*—Christopher J. Novosad
*Attorney, Agent, or Firm*—Julian C. Renfro; Michael L. Slonecker; Gay Chin

[57] ABSTRACT

A fastener system for joining together the nested ends of first and second generally tubular housing members in a tight-fitting, leak-proof manner by the use of at least one tightly compressed O-ring. The first housing member has at one end a reduced diameter external portion of finite length, around which an encircling external groove is located, whereas the second housing member has an interior portion sized so as to be able to closely receive the reduced diameter external portion of the first housing member. An encircling groove is formed around a portion of the interior of the second housing member, whereby upon the joinder portions of the first and second housing members being tightly interfitted, the encircling grooves will be brought into substantial alignment, to define an annular cavity of a size larger than either of the encircling grooves individually, into which cavity an elongate locking strip or splice ring can be readily inserted for a substantial distance, to lock the members tightly together. An O-ring may be disposed in the innermost portion of either or both of the housing members, and positioned such that the extreme end of the other housing member can come into direct therewith, thereby to achieve a sealed, leakproof joinder of the first and second housing members at such time as the joinder portions of the two housing members are brought tightly together and the locking strip inserted.

17 Claims, 5 Drawing Sheets

JOINDER OF SEPARABLE TUBULAR STRUCTURES UTILIZING PRELOADED O-RING

RELATIONSHIP TO PREVIOUS INVENTION

This is a Continuation-in-Part of my pending patent application entitled "JOINDER OF SEPARABLE TUBULAR STRUCTURES," Ser. No. 07/589,464, now abandoned, which was filed Sep. 28, 1990, and which is intended to be abandoned upon the filing of this patent application.

BACKGROUND OF THE INVENTION

1. Field of the Invention

The present invention is directed to a splicing connection assembly for retaining separable component parts of a missile, spacecraft or the like, and more particularly, to a threadless connecting arrangement for separable tubular structures of a wide variety of types and kinds, being usable for both military and civilian purposes.

2. Description of the Prior Art

The methods of joining separable tubular members are as diverse as the applications of this type of structure. Small diameter missile sections which are subjected to extreme dynamic and atmospheric environments rely on joining systems which provide both adequate mechanical support and environmental integrity.

A typical joining system for this type of usage employs a number of radially located threaded fasteners to transmit shear forces from one missile section to the next and also to compress an elastomeric environmental seal. Each of such threaded fasteners will typically require one screw, one captive nut and two rivets to retain the captive nut, for a total of four items. If, for example, the missile needs twelve of such fasteners in order to satisfy its environmental requirements, which is not an unreasonable number, the total part count for this joining system rises to forty-eight. It is important to recognize the fact that increased complexity means decreased reliability.

In the commercial area, point-of-sale cost and product liability considerations drive designers and manufacturers to slip fits, clevis pins and through-bolts for the joining of tubular structural members. Slip-fit systems provide a protrusion-free exterior but do not prevent accidental separation of the components. Clevis pins and through-bolts afford positive mechanical retention but their protruding features are often the source of user injury.

By way of additional review it should be mentioned that in the 1960s, a connection assembly design referred to as the Marman Band was proposed, which included a plurality of V-retainers or wedged shaped shoe members that provided a V-clamping to flanges positioned on the exterior surfaces of separable component parts of a spacecraft, for example. A pair of separable tension bands were joined together by a pair of spaced pyrotechnic tension bolts that could adjustably vary the tension in the straps that held the V-band coupling members. The tension straps were utilized to create inwardly radial forces on the V-shaped retainers which would in turn, wedge the flanges of cylindrical housing structures of separable component parts of the spacecraft in an axial direction. This V-band coupling was basically configured to transfer axial loads and bending moments across the resulting structural joint of the connection assembly. Small shear torque loads were transferred across the joint by relying on friction that would exist between the flange surfaces and the retainer wedges.

If the missile or spacecraft was to be subject to considerable forces that would produce large shear torque loads, either keys were inserted between the flanges or the friction load that was applied during the loading of the tension straps, had to be carefully controlled to take into consideration the magnitude of the shear torque forces that were to be expected.

Thus, often the primary connection assembly relied upon for separable spacecraft component parts were V-band couplings that were encircled with tension straps to maintain an axial loading between the spaceship component parts. Usually the friction of the band and the axial loading friction on the flanges or cylindrical structures of the spacecraft component parts were relied upon to handle any shear and torque forces.

I am aware of German Patent No. 966,298 to Raacke entitled "Threadless Connection," which teaches the joinder of two interfitted tubular members by the use of a pair of curved locking rings inserted into an encircling slot created at the juncture of the two members. However, the Raacke patent suffers from the distinct disadvantage of requiring an unnecessarily large joint, in that one embodiment involves an undesirable enlargement of the outer diameter of the device, whereas the other embodiment of the Raacke device involves an enlargement of the interior of the device, at the location of the joint. This internal enlargement necessarily results in a restriction of the lumen or effective passageway through Raacke's tubular members, and therefore a distinct diminishment of the maximum flow that can take place through the tubular members of the Raacke device.

Quite importantly, Raacke utilizes ordinary flat washers at the locations where the flat surfaces of the tubular members meet, thus requiring great precision in the machining of the components that go to make up the circular slot defined at the juncture of the two members. This is because unlike O-rings, the flat washers obviously cannot be compressed to any consequential extent, thus requiring Raacke to insert the pair of curved locking rings into the circular slot at the precise time when the flat washers have been compressed to the greatest extent possible, or otherwise leakage will result.

I am also aware of the Bennett et al U.S. Pat. No. 4,838,491 entitled "Coupling," but unlike Raacke, the Bennett et al device involves the joinder of two threaded members, meaning that relative twisting motion must take place between the two members if leakage at the joint is to be prevented. Bennett et al show the use of a pair of compressible O-rings used to prevent leakage, but both O-rings are necessarily subjected to a very large twisting force at the time the two threaded members are being tightly threaded together. This relative motion of the two threaded members frequently brings about a highly undesirable, twisting type distortion of the O-rings, with consequent leakage.

Both of these teachings fall far short of a threadless connection arrangement for a pair of tubular members, in which a highly desirable amount of compression of one or a pair of O-rings takes place at the time of joinder of the tubular members, thus to bring about a leak-free joint of constant diameter.

SUMMARY OF THE INVENTION

The improved fastener system for joining the nested ends of first and second generally tubular housing members together in accordance with a primary embodiment of this invention involves the joinder of two housing members of the same external diameter, with the first housing member having at one end a reduced diameter external portion of finite length. An encircling groove is located approximately in a midportion of the reduced diameter external portion.

The second generally tubular housing member has a recessed interior portion, of a length similar to the length of the reduced diameter external portion of the first housing member, and an inner diameter such as to be able to closely receive the reduced diameter external portion of the first housing member. An encircling groove is formed around the approximate midportion of the recessed interior portion, such that upon the first and second members being tightly interfitted, the encircling grooves of these members will be brought into substantial alignment, to define an annular cavity of a size larger than either of the encircling grooves individually. It is thus to be seen that the annular cavity encircles the reduced diameter external portion of the first member.

An elongate locking strip or splice ring of a length and diameter such that it is insertable for a substantial distance into the annular cavity thus created can be effectively utilized for holding the ends of the housing members together. The cross-sectional size of the elongate locking strip is substantially greater than the cross-sectional size of either of the encircling grooves individually, thereby to prevent separation of the first and second housing members when the locking strip is in place in the annular cavity.

Most importantly, at least one O-ring is utilized in the juncture of the first and second housing members, which O-ring is compressed to a considerable extent at the time the encircling grooves have been brought into alignment to receive the locking strip. As a consequence of this construction, this threadless joint is leakproof.

In accordance with the primary embodiment, both of the housing members are of the same diameter, with the threadless arrangement for joining these members together involving no enlargement of either the external diameter of the joint, or any enlargement of the joint in the interior of these members, with the consequence that no diminishment of flow through the members is necessitated.

Another important embodiment of this invention involves the use of interfitting tubular members, upon each of which an O-ring is mounted in an axially directed encircling groove. The positioning of both O-rings is such that upon the tubular members being pushed together to an extent necessary to receive the locking strip or splice ring, both O-rings will be compressed sufficiently as to assure a leakfree joint.

Still other embodiments of this invention can involve the joinder of two tubular members of non-identical diameter, and several alternatives as to the type of locking strips or splice rings used to hold the two sections together are set forth.

It is therefore a principal object of this invention to provide a relatively simple yet strong and highly effective threadless joinder device, enabling separable tubular members to be readily joined together in a leakproof manner, and thereafter readily separated when such becomes desirable.

It is another object of this invention to provide a joinder device for separable tubular structures that is of low cost, yet protrusion free and virtually tamperproof.

It is yet another object of this invention to provide a threadless joinder arrangement for a pair of tubular members, in which at least one O-ring is placed in substantial compression at the time the members have been joined together, thus to assure a leakproof relationship of the tubular members.

It is still another object of this invention to provide a joinder arrangement for tubular members that is lightweight, that involves a minimum number of fastening means, and that does not compromise either the effective inner diameter of the tubular members, nor involve an undesirable enlargement of the outer diameter at the location of the joint.

These and other objects, features and advantages will become more apparent as the description proceeds.

BRIEF DESCRIPTION OF DRAWINGS

FIG. 4b is an edge view of the radial waveform splice ring of FIG. 4a;

FIG. 5b is an edge view of the axial waveform splice ring of FIG. 5a;

DETAILED DESCRIPTION

Figure 1:
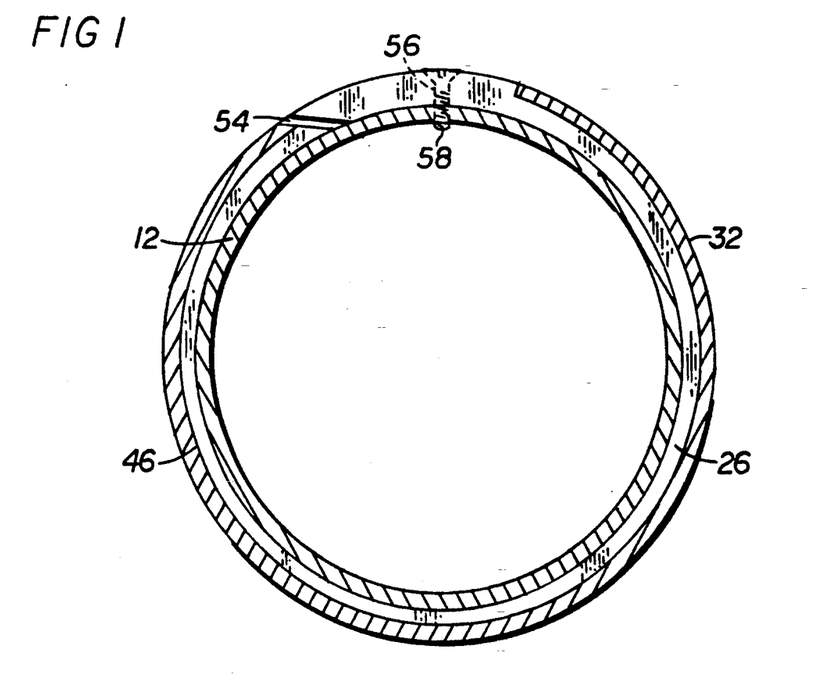
FIG. 1 is a cross-sectional view looking along the centerline of a missile, revealing how in accordance with this invention an elongate locking strip of a solid type can be inserted into a novel annular cavity defined between a pair of interfitted housing members, to hold the housing members tightly together.

With initial reference to FIG. 1 it will be seen that it is a cross-sectional view looking along the centerline of a pair of generally tubular members that have been joined together in accordance with the teachings of this invention. These generally tubular members may be components of a missile, or -may involve components of a pipe or conduit utilized for conveying fluid from one location to another.

FIG. 1 reveals how in accordance with this invention an elongate locking strip of a solid type can be inserted into an annular cavity defined between a pair of interfitted housing members, to hold the housing members tightly together in a non-leak relationship. In the illustrated instance, the first housing member 12 and the second housing member 32 are held tightly together by an elongate locking strip or splice ring 26. The details of this arrangement will be described at length hereinafter.

Figure 2:
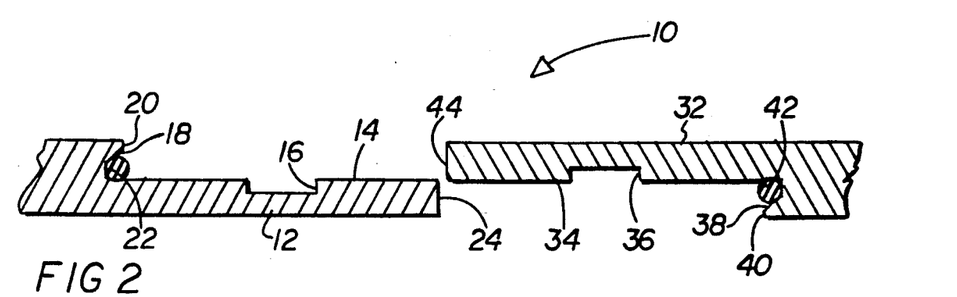
FIG. 2 is a fragmentary cross-sectional view to a somewhat larger scale, showing the configuration of the ends of a pair of separated, generally tubularly shaped housing members, with this cross-sectional view revealing how the reduced diameter portion of one member is of a size to be closely received in the end of the other member.

In FIG. 2 I reveal by means of a cross-sectional view, a preferred embodiment of a fastener system 10 in accordance with this invention, involving a first circular housing member 12 shown in a separated relationship to a second circular housing member 32. In this embodiment, the outer diameters of these two housing members are close to being identical, and likewise, the shell thicknesses are quite similar if not identical.

It will be noted from FIG. 2 that the first housing member 12 has a reduced diameter external portion 14 of finite length, with an encircling groove 16 located approximately in a midportion of this reduced diameter joinder portion 14.

A recess 18 for an O-ring is formed around the innermost end 20 of the reduced diameter external portion 14, in which recess an O-ring 22 is located. This O-ring may hereinafter be described as the first O-ring. The circumferentially disposed recess 18 is axially directed, so that when the O-ring 22 is seated in this recess, the O-ring is in the position to be contacted by a surface or portion of the second housing member, and compressed at such time as the first and second housing members 12 and 32 are assembled tightly together.

Somewhat similarly, the second housing member 32 has a recessed interior portion 34 of finite length, with an encircling groove 36 located approximately in a midportion of the recessed interior portion 34.

A circumferentially disposed recess 38 for an O-ring is formed around the innermost end 40 of the recessed interior portion 34, in which recess an O-ring 42 is located. I may hereinafter refer to the O-ring 42 as the second O-ring. Because the circumferential recess 38 is axially directed, when the O-ring 42 is disposed therein, this O-ring is in a position to be contacted by a surface or portion of the first housing member, and compressed at such time as the housing members are forced tightly together.

Figure 3A:
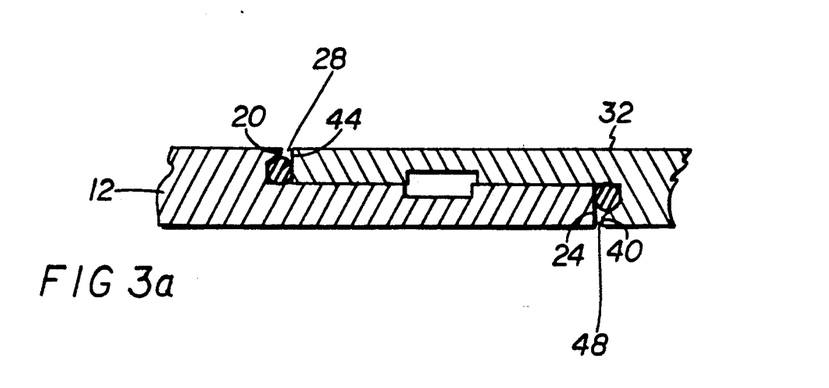
FIG. 3a is a cross-sectional view showing how the encircling groove disposed on each of the adjacent ends or joinder portions of the housing members together define an annular cavity, with an O-ring being utilized at the inner location on each member, where the extreme end of the other housing member can come into direct contact therewith, which O-rings are to be compressed at such time as the housing members are tightly interfitted, thereby to effectively eliminate leakage.

As will be apparent from FIG. 3a, the inner diameter of the recessed interior portion 34 of second housing member 32 is such as to receive the reduced diameter external portion 14 of the housing member 12 in a closely fitting manner. Because the externally placed encircling groove 16 of the first housing member is located approximately in the midportion of the reduced diameter external portion 14, and the internally placed encircling groove 36 of the second housing member is located approximately in the midportion of the recessed interior portion 34 of the second housing member, it can be expected that the grooves 16 and 36 will line up to form a splice ring cavity at such time as the joinder portions of the two housing members have been fully and firmly nested together, with the first and second O-rings being preloaded, or in other words, disposed in a compressed relationship.

It is an important aspect of the present invention to cause the length of the reduced diameter external portion 14 and the length of the recessed interior portion 34 to be such that when the outer edge 24 of the first housing member is just touching the O-ring 42, the outer edge 44 of the second housing member 32 is just touching the O-ring 22. This is apparent in FIG. 3a, and it is also apparent in this figure that a gap 28 exists between the innermost edge 20 of the first housing member 12, and the outer edge 44 of the second housing member 32. Likewise, a gap 48 of virtually the identical size exists between the outermost edge 24 of the first housing member 12, and the innermost edge 40 of the second housing member 32.

Figure 3B:
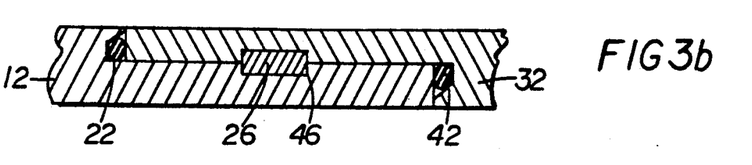
FIG. 3b is a view closely resembling FIG. 3a, showing that the joinder portions of the housing members, when pushed together in a closely interfitted manner, define an annular cavity able to receive an elongate locking strip of solid cross-section that serves to hold the housing members firmly together, and the O-rings in a tightly compressed relationship rendering the joint leakproof.

It is to be noted from FIG. 3b that when the joinder portions of the two housing members have been firmly and forcefully nested together, the gaps 28 and 48 are eliminated, and the O-rings 22 and 42 are tightly compressed in a leakproof manner. By appropriate machining of the interfitting components, the amount of O-ring compression (preloading) can be varied to provide whatever degree of sealing is desired for the interior portions of housing members 12 and 32.

From an inspection of FIG. 3b it can be seen that the grooves 16 and 36 together define an annular cavity 46 that is symmetrically shaped and noticeably larger than either of the encircling grooves individually. Therefore, upon an elongate locking strip or splice ring 26 of a cross-sectional size considerably larger than either of the grooves individually being inserted for a substantial distance into the annular cavity 46, this will prevent the first and second housing members from being separated, with the locking strip or splice ring holding the pair of O-rings in the preloaded, tightly compressed manner assuring a leakproof joint.

From an inspection of FIGS. 1, 2, 3a and 3b it is quite apparent that the instant leakproof joint is achieved without compromising either the inner diameter or the outer diameter of the tubular members at the location of the joint. In other words, I have joined the first and second tubular housing members in a substantially constant inner and outer diameter relationship. This is in contrast with a prior art arrangement in which the interior of one or both of the members encroaches into the main passageway or lumen of the tubular members, or else necessitates the enlargement of one or both of the members at an exterior joint location.

I greatly prefer to use a joinder arrangement in which a pair of O-rings is utilized, but there are certain low-cost embodiments of my invention in which only the use of a single O-ring is necessitated.

The locking strip or splice ring 26 is generally flexible, has a generally smooth exterior, and depending upon the particular application, the locking strip can be made of a graphite composite, carbon steel, brass or other shear-resistant material.

It is quite obvious that the locking strip or splice ring 26 can only be inserted from a location external to the housing members, so it should be noted in FIG. 1 that I reveal the fact that a tangential hole 54 was drilled into the exterior of the second housing member 32 at a location coinciding with the location of the internal groove 36. Because of this location of the tangential hole, at the time the two housing members have been tightly interfitted in the manner shown in FIG. 3b, it then becomes possible for a technician to slidingly insert the locking strip or splice ring 26 to a desired extent into the annular cavity 46, to effect closure of the joint in a leakproof manner.

To prevent undesired dislodgment of the locking strip or splice ring, I provide a tapped hole in the first member 12, at a location coinciding with a hole 56 in the exterior end of the locking strip or splice ring 26, into which latter hole a locking screw 58 resides. Therefore, upon the splice ring being inserted to the correct position in the annular cavity 46, the technician can apply a screw driver to the screw depicted in FIG. 1, and tighten the screw 58 until the splice ring is securely locked in the desired position.

The sturdy yet flexible splice ring 26 may be fabricated of any material which is adequate for the imposed structural load and compatible with the material used in members 12 and 32. The configuration of splice ring 26 may be varied to accommodate applications not specifically detailed herein.

Figure 4A:
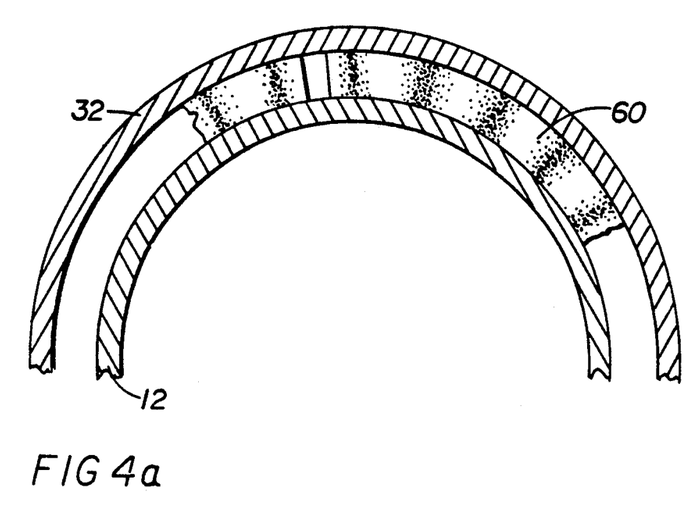
FIG. 4a is a view showing how a locking strip in accordance with this invention can take the form of a radial waveform splice ring.
Figure 4B:
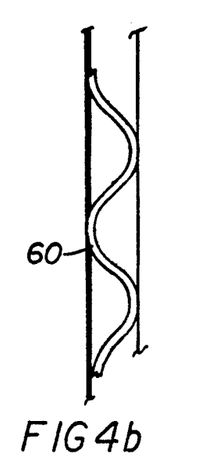

FIGS. 4a and 4b show in accordance with another embodiment of this invention, a convoluted or waveform splice ring 60 of spring steel is utilized. I prefer to call this a radial waveform splice ring, and it is much more flexible than its previously-discussed solid counterpart, splice ring 26 as depicted in FIGS. 1 and 3b. The splice ring 60 has radial volutes, and it readily lends itself to applications of oval or other irregularly-shaped tubular members.

Figure 5A:
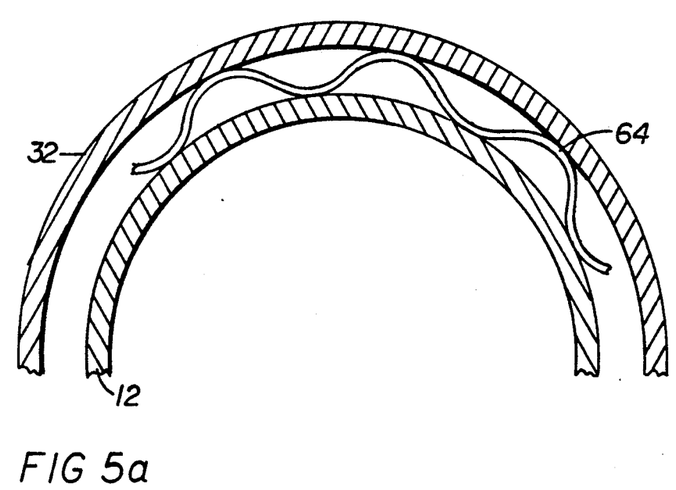
FIG. 5a is a view showing how a locking strip can take the form of an axial waveform splice ring.
Figure 5B:
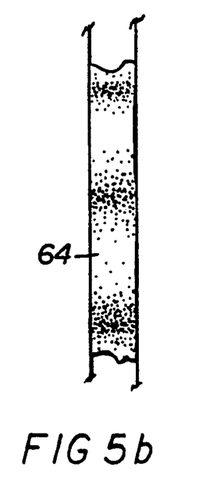

Another version of a waveform splice ring in accordance with this invention is to be seen in FIGS. 5a and 5b, which is a ring 64 with axial volutes. It is to be understood that this waveform ring formed as shown in FIGS. 5a and 5b will provide a measure of shock absorption as members 12 and 32 move axially.

Figure 6:
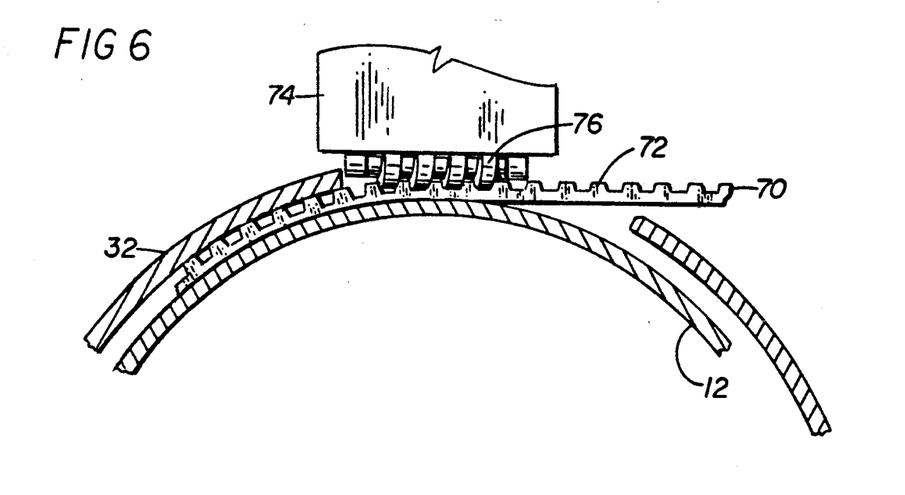
FIG. 6 shows that a splice ring in accordance with this invention can have a single series of teeth disposed along one longitudinal edge, with this arrangement making possible the use of a power driven worm gear for inserting the splice ring into the annular cavity defined between the interfitted housing members.

Still another embodiment of a splice ring is illustrated in FIG. 6, which is a splice ring 70, along one longitudinal edge of which a series of consistently spaced teeth 72 are formed. FIG. 6 shows how it would be possible to use a power driven device 74 having a worm gear 76 to engage the teeth 72 of the splice ring. By utilizing power means for driving the worm gear 76, it is readily possible to rapidly install this toothed version of a flexible splice ring between the adjacent circular members.

Figure 7A:
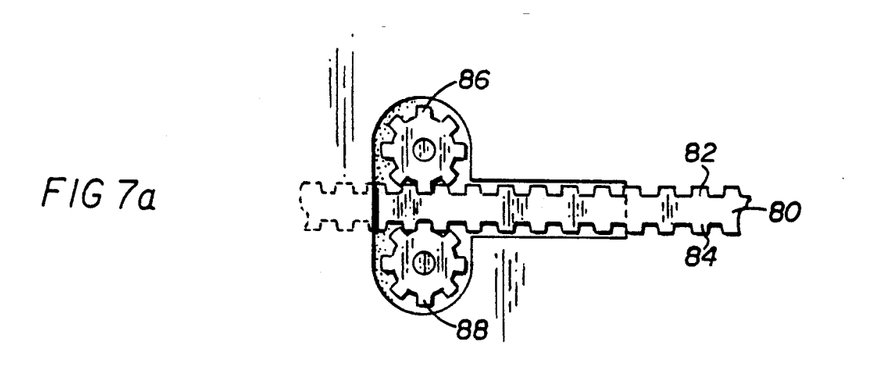
FIGS. 7a and 7b show that the splice ring can have a double series of teeth, that are disposed along opposite longitudinal edges of the splice ring, with this arrangement making possible the use of a pair of oppositely rotating spur gears forcibly inserting the splice ring into the annular cavity defined between the interfitted housing members.
Figure 7B:
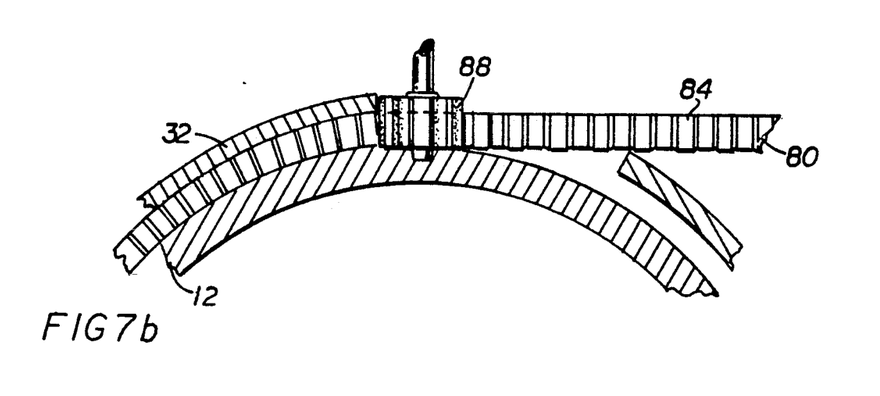

FIG. 7a and 7b depict another toothed version of a splice ring, this being splice ring 80 having two sets of consistently spaced teeth, these being teeth 82 disposed along one longitudinal edge, and teeth 84 spaced along the opposite longitudinal edge of the splice ring. In accordance with this embodiment, tooth set 82 of the longitudinally spaced teeth are engaged by spur gear 86, and tooth set 84 is engaged by spur gear 88. The gears 86 and 88 are driven in opposite directions at the same rotative speed from a common source, and this arrangement makes it readily possible to install the double toothed, flexible splice ring rapidly, and without any torsional reaction being transmitted to the tool.

Figure 8:
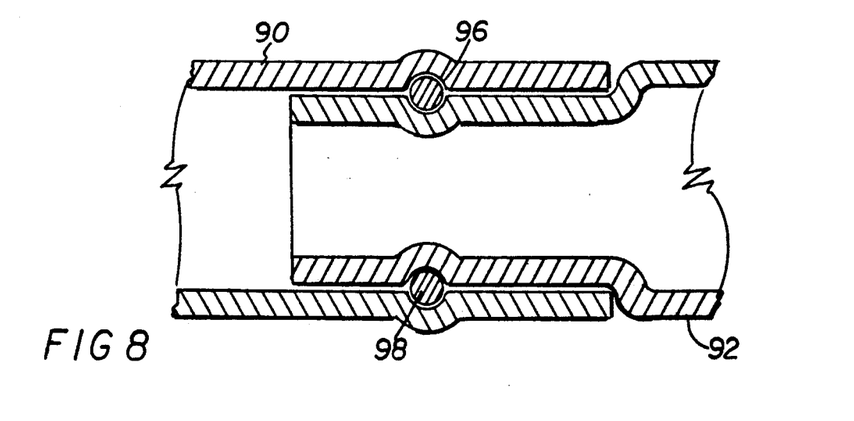
FIG. 8 is a cross-sectional view of an embodiment in which the end of one tubularly shaped housing member of a somewhat different type is of reduced diameter, so as to permit it to be inserted into the end of the adjacent tubularly shaped housing member.

For low-cost commercial applications where environmental seals are not required, structural loading is not a major consideration and tamper resistance is desirable, the design illustrated in FIG. 8 would be appropriate. Member 90, of a largely consistent diameter, and member 92, having a necked down diameter to fit inside member 90, are formed by swage-forming the annular grooves shown. Upon nesting, the opposing grooves form a generally circular cavity 96. In this embodiment there is no stringent requirement for a close fit between the members 90 and 92, as was the case in the embodiment described in connection with FIG. 1 through 3b, but in FIG. 8 and the figures following FIG. 8, the depicted spacings are somewhat exaggerated in the interests of clarity.

Figure 9A:
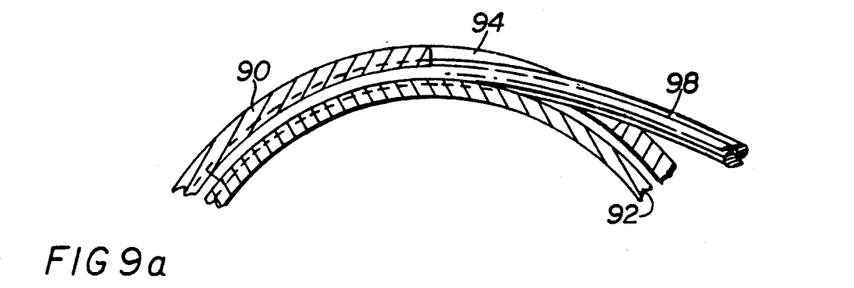
FIGS. 9a, 9b and 9c are a series of related figures revealing the procedure by which the solid type splice ring of the type utilized in FIG. 8 is inserted into the space between the interfitted housing members.
Figure 9B:
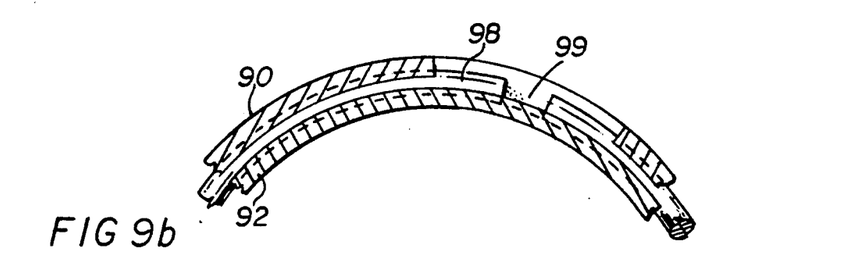
Figure 9C:
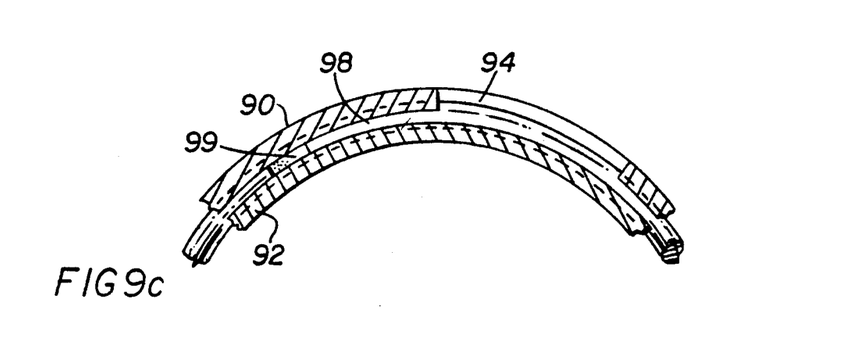

With reference now to FIGS. 9a, 9b and 9c, an opening 94 in the outer member 90, visible in FIG. 9a, coincides with the cavity 96, and is the point at which a wire splice ring 98 is inserted. Insertion of the splice ring or locking strip 98 continues until it is fully enclosed in the cavity, in the manner visible in FIG. 9b. At this point, spring action of splice ring 98 causes the free end to snap down into the cavity.

An amount of relative rotation between the members 90 and 92 will result in the joint or gap 99 in splice ring 98 being moved to a point in the cavity 96 where the joint is no longer visible through the opening 94 in member 90; note FIG. 9c. The resulting joint is mechanically positive, free of protrusions and virtually tamper-proof.

Figure 10A:
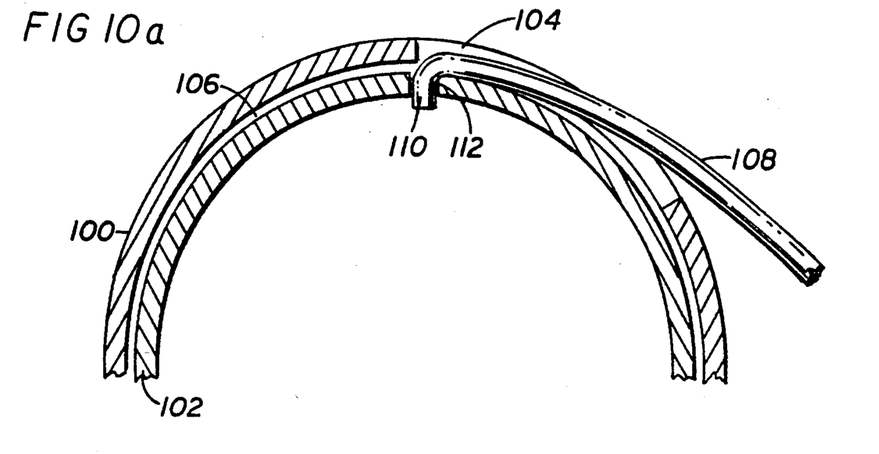
FIGS. 10a, 10b and 10c are a series of related figures revealing the procedure by which a splice ring with a hook on one end can be installed by rotating the inner housing member.
Figure 10B:
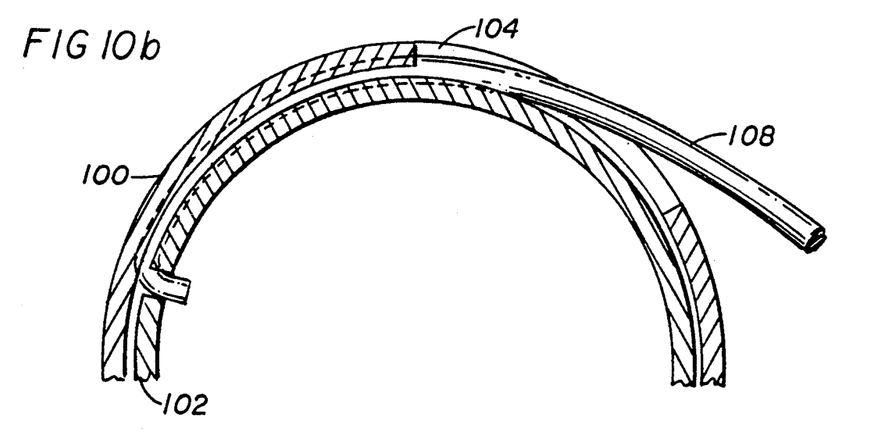
Figure 10C:
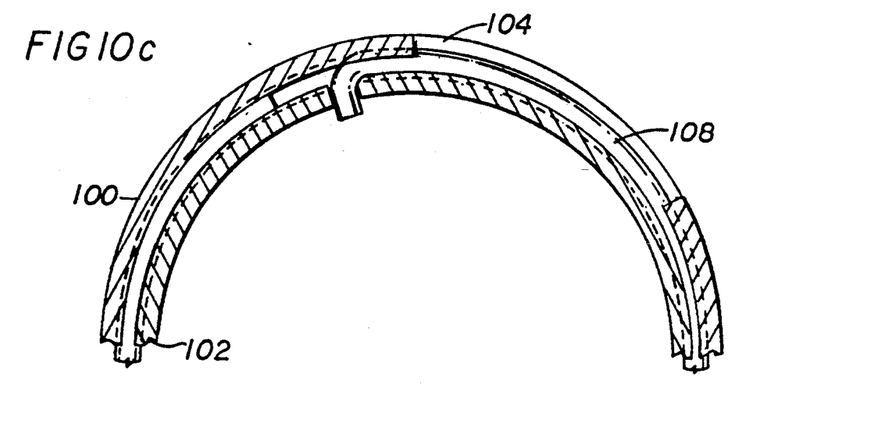

Another embodiment of my invention is revealed in related FIG. 10a through 10c, wherein outer member 100 and inner member 102 are shown in assembled relationship. A space or cavity 106 to receive a splice ring exists between the members 100 and 102, created by grooving the interior of member 100 and the exterior of member 102 at carefully aligned locations. In this instance, the inner member 102 is rotatable with respect to member 100.

An opening 104 in the outer member 100, visible in each of these three figures, coincides with the cavity 106 and is the point at which a wire splice ring 108 is inserted. A hook 110 is provided at the end of splice ring 108, which hook is to be brought into contact with a hole or notch 112 provided in the inner housing member 102.

Insertion of the splice ring or locking strip 108 into the space 106 is brought about by the rotation of the inner housing member 102 which, in the instance illustrated in FIG. 10b, is turned in the counter-clockwise direction. Rotations continues in the general manner illustrated in FIG. 10b, until the ring 108 is fully enclosed in the cavity formed between the two members, in the manner visible in FIG. 10c.

As a result of the splice ring 108 having been moved to a point in the cavity where the joint is no longer visible through the opening 104 in member 100, the resulting joint is mechanically positive, free of protrusions and virtually tamperproof.

It is thus to be seen that I have provided a novel securing arrangement for a pair of interfitted, cylindrically-shaped members equipped with encircling grooves, involving the use of an elongate, shear-resistant member inserted into the grooves when they have been brought into coincidence, thereby serving to hold the members tightly together.

I claim:

1. A fastener system for joining together the nested ends of first and second generally tubular housing members that have closely similar internal and external diameters, said first housing member having a joinder portion of lesser diameter, upon which an encircling external groove is located in the vicinity of one end thereof, said second member having an interior joinder portion sized so as to be able to closely receive said lesser diameter joinder portion of said first housing member, an encircling groove formed around the interior of the joinder portion of said second member, said groove in said second member being approximately the same size as the groove located around the lesser diameter joinder portion of said first member, whereby upon the joinder portions of said first and second members being tightly interfitted, said encircling grooves will be brought into substantial alignment, to define an annular cavity of a size larger than either of said encircling grooves individually, into which an elongate locking strip can be inserted, a circumferential, axially directed recess formed around the innermost location of each of said joinder portions of said first and second housing members, in each of which recesses an O-ring is located, each of said O-rings, by virtue of being located in respective axially directed recesses, being open to contact with an adjacent member, said first and second housing members, upon being brought tightly together for the insertion of the locking strip, bringing about a compression of said O-rings, thus to render the connection of said housing members leak-free, said locking strip having a series of consistently spaced teeth disposed along one longitudinal edge, to facilitate the insertion of said locking strip by power applying means meshing with said teeth.

2. A fastener system for joining together the nested ends of first and second generally tubular housing members that have closely similar internal and external diameters, said first housing member having a joinder portion of lesser diameter, upon which an encircling external groove is located in the vicinity of one end thereof, said second member having an interior joinder portion sized so as to be able to closely receive said lesser diameter joinder portion of said first housing member, an encircling groove formed around the interior of the joinder portion of said second member, said groove in said second member being approximately the same size as the groove located around the lesser diameter joinder portion of said first member, whereby upon the joinder portions of said first and second members being tightly interfitted, said encircling grooves will be brought into substantial alignment, to define an annular cavity of a size larger than either of said encircling grooves individually, into which an elongate locking strip can be inserted, a circumferential, axially directed recess formed around the innermost location of each of said joinder portions of said first and second housing members, in each of which recesses an O-ring is located, each of said O-rings, by virtue of being located in respective axially directed recesses, being open to contact with an adjacent member, said first and second housing members, upon being brought tightly together for the insertion of the locking strip, bringing about a compression of said O-rings, thus to render the connection of said housing members leak-free, said locking strip having a dual series of consistently spaced teeth disposed along oppositely placed longitudinal edges, to facilitate the insertion of said locking strip by dual power applying means meshing with said teeth.

3. A fastener system for joining together the nested ends of first and second generally tubular housing members in a substantially constant inner and outer diameter relationship, accomplished in a tight-fitting, leak-proof manner by the use of at least one tightly compressed O-ring, said first housing member having at one end a reduced diameter external portion of finite length, around which an encircling external groove is located, said second housing member having an interior portion sized so as to be able to closely receive said reduced diameter external portion of said first housing member, an encircling groove formed around a portion of the interior of said second housing member, whereby upon said first and second housing members being tightly interfitted, said encircling grooves will be brought into substantial alignment, to define an annular cavity of a size larger than either of said encircling grooves individually, a circumferentially disposed recess formed around the inner end of the external portion of said first housing member, said recess being axially directed, with an O-ring seated in said recess, said O-ring, by virtue of being positioned in said axially directed recess, being open to contact with said second housing member, the outermost edge portion of said second housing member coming into a sealing relationship with said O-ring at the time said first and second housing members are brought tightly together to compress said O-ring, and an elongate locking strip of a length such that it can be readily inserted for a substantial distance into said annular cavity at the time said O-ring has been compressed, the cross-sectional dimension of said elongate locking strip being substantially greater than the cross-sectional size of either of said encircling grooves individually, thereby to prevent separation of said first and second housing members when said locking strip is in place in said annular cavity, said locking strip having a series of consistently spaced teeth disposed along oppositely placed longitudinal edges, to facilitate the insertion of said locking strip by power applying means meshing with said teeth.

4. A fastener system for joining together the nested ends of first and second generally tubular housing members in a substantially constant inner and outer diameter relationship, accomplished in a tight-fitting, leak-proof manner by the use of at least one tightly compressed O-ring, said first housing member having at one end a reduced diameter external portion of finite length, around which an encircling external groove is located, said second housing member having an interior portion sized so as to be able to closely receive said reduced diameter external portion of said first housing member, an encircling groove formed around a portion of the interior of said second housing member, whereby upon said first and second housing members being tightly interfitted, said encircling grooves will be brought into substantial alignment, to define an annular cavity of a size larger than either of said encircling grooves individually, a circumferentially disposed recess formed around the inner end of the external portion of said first housing member, said recess being axially directed, with an O-ring seated in said recess, said O-ring, by virtue of being positioned in said axially directed recess, being open to contact with said second housing member, the outermost edge portion of said second housing member coming into a sealing relationship with said O-ring at the time said first and second housing members are brought tightly together to compress said O-ring, and an elongate locking strip of a length such that it can be readily inserted for a substantial distance into said annular cavity at the time said O-ring has been compressed, the cross-sectional dimension of said elongate locking strip being substantially greater than the cross-sectional size of either of said encircling grooves individually, thereby to prevent separation of said first and second housing members when said locking strip is in place in said annular cavity, said locking strip having a dual series of consistently spaced teeth disposed along oppositely placed longitudinal edges, to facilitate the insertion of said locking strip by dual power applying means meshing with said teeth.

5. A fastener system for joining the nested ends of first and second generally tubular housing members together in a tight-fitting, substantially leak-proof manner by the use of at least one tightly-compressed O-ring, said housing members being joined in such a manner as to have a substantially constant inner and outer diameter relationship, said first housing member having at one end a reduced diameter external portion of finite length, with an encircling groove located approximately in a midportion of said reduced diameter external portion, said second member having a recessed interior portion, of a length similar to the length of said reduced diameter external portion, and of an inner diameter such as to be able to closely receive said reduced diameter external portion of said first housing member, an encircling groove disposed around the approximate midportion of said recessed interior portion in said second member, said groove in said second member being approximately the size of said encircling groove in said first member, whereby upon said first and second members being tightly interfitted, said encircling grooves will be brought into substantial alignment, to define an annular cavity of a size larger than either of said encircling grooves individually, which annular cavity encircles said reduced diameter external portion of said first member, a circumferential recess formed around the innermost location of said interior portion of said second housing member, said recess being axially directed, in which recess an O-ring is received, said O-ring, by virtue of being positioned in said axially directed recess, being open to contact with said first housing member, the outermost edge portion of said first housing member coming into a sealing relationship with said O-ring at the time said first and second housing members are brought tightly together to compress said O-ring, and an elongate locking strip of a length and cross-sectional dimension such that it can be readily inserted for a substantial distance into said annular cavity at the time said O-ring has been compressed, the cross-sectional dimension of said elongate locking strip being substantially greater than the cross-sectional size of either of said encircling grooves individually, thereby to prevent separation of said first and second housing members when said locking strip is in place in said annular cavity.

6. The fastener system for joining together the nested ends of said first and second generally tubular housing members as recited in claim 5 in which a circumferential recess is also formed around the innermost location of said reduced diameter external portion of said first housing member, said recess being axially directed, an O-ring seated in said recess, said O-ring, by virtue of being positioned in said axially directed recess, being open to contact with said second housing member, the outermost edge portion of said second housing member coming into a sealing relationship with latter O-ring at the time said first and second housing members are brought tightly together, with both of said O-rings being compressed to a like extent.

7. The fastener system for joining the nested ends of first and second generally tubular housing members together as recited in claim 5 in which said locking strip is of solid, flexible construction.

8. The fastener system for joining the nested ends of first and second generally tubular housing members together as recited in claim 5 in which said locking strip has a series of consistently spaced teeth disposed along oppositely placed longitudinal edges, to facilitate the insertion of said locking strip by power applying means meshing with said teeth.

9. The fastener system for joining the nested ends of first and second generally tubular housing members together as recited in claim 5 in which said locking strip has a dual series of consistently spaced teeth disposed along oppositely placed longitudinal edges, to facilitate the insertion of said locking strip by dual power applying means meshing with said teeth.

10. The fastener system for joining the nested ends of first and second generally tubular housing members together as recited in claim 5 in which said locking strip is of a waveform configuration.

11. The fastener system for joining the nested ends of first and second generally tubular housing members together as recited in claim 10 in which said waveforms in said locking strip are axially disposed.

12. The fastener system for joining the nested ends of first and second generally tubular housing members together as recited in claim 10 in which said waveforms in said locking strip are radially disposed.

13. A fastener system for joining the nested ends of first and second generally tubular housing members together in a tight-fitting, substantially leak-proof manner by the use of two tightly-compressed O-rings, said housing members being joined in such a manner as to have a substantially constant inner and outer diameter relationship, said first housing member having at one end a reduced diameter external portion of finite length, with an encircling groove located approximately in a midportion of said reduced diameter external portion, said second member having a recessed interior portion, of a length similar to the length of said reduced diameter external portion, and of an inner diameter such as to be able to closely receive said reduced diameter external portion of said first housing member, an encircling groove disposed around the approximate midportion of said recessed interior portion in said second member, said groove in said second member being approximately the size of said encircling groove in said first member, whereby upon said first and second members being tightly interfitted, said encircling grooves will be brought into substantial alignment, to define an annular cavity of a size larger than either of said encircling grooves individually, which annular cavity encircles said reduced diameter external portion of said first member, a circumferentially disposed recess formed around the inner end of the external portion of said first member, said recess being axially directed, with a first O-ring seated in said recess, said first O-ring, by virtue of being positioned in said axially directed recess, being open to contact with said second housing member, a mid-circumferentially disposed recess also being formed around the innermost location of said interior portion of said second housing member, said recess being axially directed, in which recess a second O-ring is received, said second O-ring, by virtue of being positioned in said axially directed recess, being open to contact with said first housing member, an outermost edge of said second housing member coming into sealing relationship with said first O-ring at the same time as an outermost edge of said first housing member comes into sealing relationship with said second O-ring, as a consequence of said first and second housing members being brought tightly together to compress both O-rings, and an elongate locking strip of a length and cross-sectional dimension such that it can be readily inserted for a substantial distance into said annular cavity at the time said O-rings have been compressed, the cross-sectional dimension of said elongate locking strip being substantially greater than the cross-sectional size of either of said encircling grooves individually, thereby to prevent separation of said first and second housing members when said locking strip is in place in said annular cavity.

14. The fastener system for joining the nested ends of first and second generally tubular housing members together as recited in claim 13 in which said locking strip has a series of consistently spaced teeth disposed along oppositely placed longitudinal edges, to facilitate the insertion of said locking strip by power applying means meshing with said teeth.

15. The fastener system for joining the nested ends of first and second generally tubular housing members together as recited in claim 13 in which said locking strip has a dual series of consistently spaced teeth disposed along oppositely placed longitudinal edges, to facilitate the insertion of said locking strip by dual power applying means meshing with said teeth.

16. A fastener system for joining the nested ends of first and second generally tubular housing members together, said first housing member having at one end a reduced diameter external portion of finite length, with an encircling groove located approximately in a midportion of said reduced diameter external portion, said second member having a recessed interior portion, of a length similar to the length of said reduced diameter external portion, and of an inner diameter such as to be able to closely receive said reduced diameter external portion of said first housing member, an encircling groove disposed around the approximate midportion of said recessed interior portion in said second member, said groove in said second member being approximately the size of said encircling groove in said first member, whereby upon said first and second members being tightly interfitted, said encircling grooves will be brought into substantial alignment, to define an annular cavity of a size larger than either of said encircling grooves individually, which annular cavity encircles said reduced diameter external portion of said first member, and an elongate locking strip of a length and cross-sectional dimension such that it can be inserted for a substantial distance into said annular cavity, the cross-sectional dimension of said elongate locking strip being substantially greater than the cross-sectional size of either of said encircling grooves individually, thereby to prevent separation of said first and second housing members when said locking strip is in place in said annular cavity, said locking strip having a series of consistently spaced teeth disposed along one longitudinal edge, to facilitate the insertion of said locking strip by power applying means meshing with said teeth.

17. The fastener system for joining the nested ends of first and second generally tubular housing members together as recited in claim 16 in which said locking strip has a dual series of consistently spaced teeth disposed along oppositely placed longitudinal edges, to facilitate the insertion of said locking strip by dual power applying means meshing with said teeth.

* * * * *